United States Patent [19]

Fell

[11] 4,168,254
[45] Sep. 18, 1979

[54] VIDEOJET INK COMPOSITION

[75] Inventor: David A. Fell, Menasha, Wis.

[73] Assignee: American Can Company, Greenwich, Conn.

[21] Appl. No.: 909,469

[22] Filed: May 25, 1978

[51] Int. Cl.² .............................................. C08L 63/00
[52] U.S. Cl. ..................... 260/29.2 EP; 260/DIG. 38; 428/413
[58] Field of Search ................ 260/29.2 EP, DIG. 38

[56] References Cited
U.S. PATENT DOCUMENTS

| | | | |
|---|---|---|---|
| 3,351,008 | 11/1967 | Lincoln et al. | 260/29.2 EP |
| 3,985,695 | 10/1976 | Tobias et al. | 260/29.2 EP |

Primary Examiner—J. Ziegler
Attorney, Agent, or Firm—Robert P. Auber; Ira S. Dorman; Ernestine C. Bartlett

[57] ABSTRACT

Ink compositions suitable for ink jet printing on a variety of substrates including metal, synthetic polymers and glass, are provided. The compositions are characterized by excellent weathering properties, are fade-resistant, abrasion-resistant and, when heated to temperatures of about 300° F., exhibit resistance to aircraft hydraulic fluids. The preferred compositions comprise essentially a colorant or combinations thereof, an epoxy-phenolic binder resin component, a solvent mixture containing alcohol, water, methyl ethyl ketone or methyl cellosolve and, optionally, an electrolyte.

7 Claims, No Drawings

VIDEOJET INK COMPOSITION

BACKGROUND OF THE INVENTION

1. List of the Prior Art

The prior art appears to be best exemplified by the following patents:

Banczak, U.S. Pat. Nos. 4,021,252; May 3, 1977 Wachtel, 4,024,096; May 17, 1977 Parkinson, 4,045,397; Aug. 30, 1977 Hwang, 4,070,322; Jan. 24, 1978 Parkinson, German Offenlegungsschrift 2,617,407; Oct. 28, 1976.

2. Field of the Invention

This invention relates to jet ink compositions suitable for ink jet printing on a variety of substrates including metal, synthetic polymers and glass.

Ink jet printing techniques, although of comparatively recent development in the art of applying decorative and identifying indicia to a substrate, are of increasing importance. In general such techniques impose rigid requirements on the ink compositions. To be suitable for use as a jet ink, the compositions must meet rigid requirements of viscosity and resistivity, solubility, compatibility of components, wettability of substrate, must be quick drying and smear resistant without clogging the ink jet nozzle and must permit rapid clean-up of the machine components with minimum effort. At the same time, such compositions must also be adapted for satisfactory performance in the particular end use application.

To date, where the end use requirements have necessitated abrasion-resistance, resistance to weathering and fade-resistance together with suitability for use on a variety of substrates such as, for example, polymeric surfaces, metal surfaces or glass surfaces, ink jet compositions have not been satisfactory since no ink offering such versatility has been available. Jet inks possess numerous advantages over those inks applied by conventional techniques such as letter press, gravure, silkscreen or other similar conventional techniques. Such conventional inks are not suitable for jet ink printing because they frequently contain pigments which cause clogging problems in the ink jet equipment. Additionally, conventional inks generally require curing at elevated temperatures for extended periods of time. Moreover, their use in printing polymer coated surfaces, etc. has not been particularly efficacious primarily because the means of applying such inks have not been conducive to high speed techniques.

It is an object of this invention to provide ink compositions, suitable for use in ink jet printing techniques, that exhibit excellent characteristics of fade-resistance, abrasion-resistance, and weathering.

It is another object of this invention to provide jet ink compositions suitable for application to a variety of surfaces including polymer substrates, metal substrates and glass substrates. Yet another object of this invention is to provide jet ink compositions suitable for application to polymer coated wires.

Another object of the invention is to provide substrates bearing identifying indicia, derived by application of said jet ink composition employing an ink jet printing technique.

Another object is to provide indicia-containing polymer coated wires that are suitable for use in aircraft and that, when heated at temperatures of about 300° F., are characterized by resistance to hydraulic fluids commonly employed.

These and other objects of the invention will be apparent from the description of the invention which follows:

SUMMARY OF THE INVENTION

This invention relates to jet ink compositions comprising at least one colorant, a binder resin and a solvent blend consisting essentially of from about 25 to 40% of a lower aliphatic alcohol having 1 to 3 carbon atoms and mixtures thereof, from about 0 to 40% of an organic compound selected from the group consisting of aliphatic ketones having 3 to 8 carbon atoms, 0–20% of a lower alkylene glycol ethers and 5 to 15% water. Such compositions are characterized by excellent fade-resistance, abrasion-resistance and, resistance to weathering and are especially suitable for forming identifying indicia on a variety of substrates including glass, ceramics, polymeric resins, polymer coated wire and coated and uncoated aluminum and steel.

DETAILED DESCRIPTION OF THE INVENTION

The above-described jet ink compositions contain a colorant, a solvent blend, a resinous component and other optional ingredients, all of which must be in carefully balanced proportion to achieve (1) successful operation of the ink in a jet printing apparatus and (2) suitable properties for use in coating the particular substrate.

In general, suitability of the inks herein for the desired end use is measured in accordance with the following standards:

(1) Inks must dry instantly or be smear resistant upon application and dry completely in about 15 seconds without a post cure;

(2) Indicia printed on polymer coated wire must be abrasion-resistant to the extent that it remains legible at a minimum distance of 15 inches in minimum daylight (30 foot candles) after 20 rubs with an abrasive felt employing 2 lb. pressure at a speed of 30 to 60 rubs per minute;

(3) printing does not damage polymer coating wire insulation. When immersed in a water solution containing 5% NaCl and a potential of 2000 volts rms. is applied for one minute between the primary conductor and an electrode in the solution, there is no dielectric breakdown of the primary wire insulation, and the indicia remains legible thereafter;

(4) an optional requirement, when such compositions are to be employed in certain specific aircraft is that the characters printed on polymer coated wire must withstand a 24 hour minimum soak in Skydrol, a hydraulic fluid containing active tributyl phosphate, (available commercially from Monsanto as Skydrol LD) at a temperature of 70° C. and, after air drying at room temperature for 24 hours, the characters remain legible thereafter;

(5) characters printed on polymer coated wire remain legible after a 24 hour minimum exposure, in a weatherometer, to alternating cycles of ultraviolet light and tap water spray wherein the cycle periods are about 102 minutes exposure to ultraviolet light followed by about 18 minutes exposure to both ultraviolet light and tap water spray.

(6) Indicia printed on glass must exhibit ready adhesion to the glass, be abrasion and fade resistant and have the capability of withstanding conditions of moisture and elevated temperature normally encountered in pasteurization when the glass is designed for such use as beer bottles, etc.

(7) Indicia printed on metal must exhibit ready adhesion to metal or synthetic polymeric coatings on such metal; exhibit resistance to fading and capability of maintaining adhesion under typical brewery pasteurization conditions when immersed in solution for 15 minutes at 150° F.

The above characteristics are indeed stringent requirements for an ink composition of suitable viscosity, electrical resistivity and surface tension properties, etc. to render it operable in ink jet printing apparatus. The ink compositions of this invention meet these requirements.

COMPONENTS OF THE COMPOSITION

The Colorant

The characteristics exhibited by the colorant are of prime consideration to achieve the stringent resistance properties discussed hereinabove. In general, suitable colorants are dyes characterized by sufficient solubility in the solvent mixture to give the desired color intensity and compatibility with the other components of the compositions. Neozapon Black RE (available commercially from BASF) is a particularly effective colorant for conveying light fastness (fade resistance) to the ink while Hecto Black R (also available from BASF) is most effective to convey Skydrol resistance for use in printing polymer coated wire. Mixtures of such colorants may also be used.

It is contemplated that functionally equivalent dyes other than Neozapon Black RE and Hecto Black R may also be employed. Neozapon Black RE is believed to be similar to Acid Black 63, Colour Index No. 21295 and Solvent Black 27.

Such dyes appear to be chromium-complexed azo type dyes. Satisfactory results have been obtained when employing Neozapon Red BE, Neozapon Red GE, Neozapon Fire Red G and Neozapon Blue FLE.

In addition to the colorants discussed above, other dyes may be substituted or utilized in combination therewith.

Suitable Dyes include those of the basic type, for example of the C.I. Basic Blue, C.I. Basic Black and C.I. Basic Green types including methyl violet, ethyl violet, crystal blue, chrysoidine, Victoria Blue, rhodamine, auramine, etc. Mixtures of any of the illustrative dyes mentioned hereinabove may also be employed. Colorants may be incorporated in the compositions in amounts up to about 5% by weight of the ink.

The Resin Binder

The resins suitable for use herein are classified as epoxy-phenolic resins and as especially epoxy ethers of bisphenols. Such resins are well known in the art and are generally derived from the alkaline catalyzed reaction of epichlorohydrin with said bisphenols. Such classic epoxy resins known in the art as DGEBA resins are believed to have the form of a polyglycidyl or diglycidyl ether of bisphenol A. The structure usually assigned to the product is

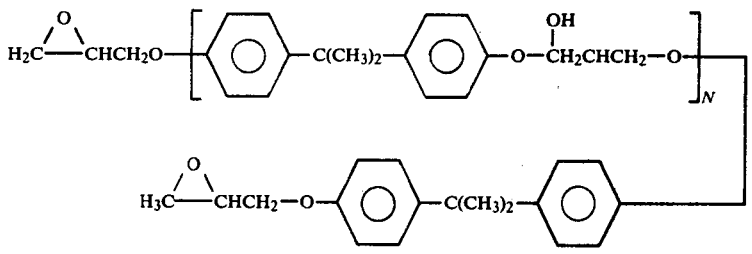

Suitable products vary from epoxy resins of the monomeric diglycidyl ether of bisphenol A (n=0) or similar materials wherein n=1, 2, 3 etc. Especially preferred are low molecular weight epoxy-phenolic resins having viscosities in the range of about 100 to about 500. The prime requirement of the resin is that it must exhibit suitable solubility and compatibility for incorporation in the ink compositions of this invention and be of sufficiently low viscosity so that the viscosity of the ink is not increased above about 3.0 centipoises. Particularly preferred are such epoxy-phenolic resins available commercially under the trademark Varcum from Reichhold Chemicals, Inc.

The resin component is critical herein since it is believed to convey the properties permitting the ink compositions to exhibit the excellent printing and adhesion properties, on a variety of substrates displayed by the inks of the invention.

The Solvent Blend

Although minor amounts of other solvents may be included if desired, the primary solvent blend is a mixture of (a) from about 25 to 40% of one or more lower aliphatic monohydric alcohols such as methanol, ethanol or propanol, (b) from about 0 to 20% of an organic compound selected from the group consisting of low molecular weight glycol ethers, including ethylene glycol monomethyl ether (commonly known as methyl cellosolve), ethylene glycol monoethyl ether (cellosolve), propylene glycol monomethyl ether and propylene glycol monoethyl ethers; (c) from about 0 to 40% lower alphatic ketones having 3 to 8 carbon atoms including methyl ethyl ketone, 2-heptanone, petanone, 2-butanone, 2-hexanone and mixtures thereof and (d) from about 5 to 20% water. All percents are by weight unless otherwise specified.

The concentration of water in the composition is critical to the successful practice of the invention since too much water will cause precipitation of the epoxy-phenolic resin from the ink solution. Conversely, if a sufficient amount of water is not present, the viscosity of the ink will be too low and proper functioning of the composition in the ink jet printing apparatus will be impaired. In general, concentrations of about 5% to about 15% will be satisfactory.

Other optional components may be added to the composition to convey special characteristics.

A small amount of ammonia or similar alkalizing agent, in the form of concentrated aqueous solution may be added when necessary to maintain the system in a pH range of about 7 to 8.5. When used, such ammonia water (26° Baume) will be present in amounts of about 0 to 0.2% by weight of the total ink composition.

Electrolytes are conventionally used in jet ink compositions to maintain the specific resistivity of the ink within desired limits. The ink compositions herein in most instances will have a specific resistivity within the operable range without the necessity of adding an electrolyte for this purpose. In general however, optimum results may be obtained by addition of electrolytic components that are soluble in the ink medium and which have no deleterious effect on the printing apparatus or on the printed substrate. Satisfactory compounds for this use include dimethyl amine hydrochloride, sodium propionate, sodium acetate, etc. with sodium propionate being especially preferred. In general, an effective amount of such electrolytic composition will be in the range of about 0 to about 0.1% of the composition.

The following examples are illustrative of ink compositions meeting the end-use requirements discussed hereinabove and which are effective in jet printing operations as herein described.

EXAMPLE 1

The following ink composition was prepared from:
342 ml.: Methanol
342 ml: Methyl Ethyl Ketone
127.3 g.: Varcum 29-108 epoxy-phenolic resin
79 ml.: Isopropanol
140 ml.: Distilled Water
18.6 g.: Victoria Blue
0.939 g.: Sodium Propionate The ink had a viscosity of 2.08 centipoises at 74° F. and a resistivity of 1080 ohm-cm. at 74° F.

The ink was printed on (1) wire samples coated with various polymers (2) glass and (3) coated and uncoated aluminum and steel using a jet ink printing operation.

The ink dried within 5 seconds. After drying the printed substrates were tested for adhesion and abrasion resistance by rubbing with an abrasive felt employing a 2 lb. pressure at a speed of 30 to 60 rubs per minute. The results were as indicated in the Table which follows:

Table

| Run No. | Substrate | Rub-Resistance | Appearance |
|---|---|---|---|
| 1. | Nylon | Pass-Excellent | Excellent |
| 2. | Black High-Density Polyethylene | Pass | Good printing poor print contrast on black substrate. |
| 3. | Black Ethylene-Vinyl Acetate | Pass | Good printing Code difficult to see but visible on black surface. |
| 4. | Polyvinyl chloride, Gray, yellow, Orange, white | Excellent | Excellent; Prints well; visible |
| 5. | White Silicone Rubber | Moderate | Excellent |
| 6. | Black Polychloroprene | Moderate | Very difficult to see. |
| 7. | Glass | Pass | Excellent |
| 8. | Metal | Pass | Excellent |
| 9. | Metal | Pass | Excellent |

Table-continued

| Run No. | Substrate | Rub-Resistance | Appearance |
|---|---|---|---|
| 10. | Polyimide | Pass | Excellent |

EXAMPLE 2

The following ink compositions were prepared from:

| Ink 2A: | |
|---|---|
| Methanol | 28.5% |
| Methyl ethyl ketone | 29.0% |
| Varcum 29-108 epoxy-phenolic resin | 13.4% |
| Isopropyl alcohol | 6.5% |
| Distilled Water | 10.5% |
| Sodium propionate | 0.1% |
| Ethyl Violet Dye | 2.0% |
| Methyl cellosolve | 9.8% |

The ink had the following properties at 24° C.:
Velocity of Sound: 1323 meters/second
Resistivity: 1200 ohm-cm.
Brookfield Viscosity: 2.05 cps.

| Ink 2B | |
|---|---|
| Methanol | 31.65 |
| Methyl ethyl ketone | 32.20% |
| Varcum 29-108 epoxy-phenolic resin | 14.89% |
| Isopropyl alcohol | 7.29% |
| Distilled Water | 11.68% |
| Sodium propionate | 0.11% |
| Victoria Blue FGA dye | 2.18% |

The ink had the following properties at 24° C.:
Velocity of sound: 1319 meters/second
Resistivity: 1200 ohm-cm.
Brookfield Viscosity: 2.10 cps.
Surface tension: 28 to 29 dyne-cm. The above inks were employed to print indicia on Kapton polyimide polymer polymer coated wire by jet ink printing. After application, both inks dried within 5 seconds. After drying, the wire printed with each ink was tested and found to be abrasion-resistant to the extent that it remained legible at a minimum distance of 15 inches in minimum daylight after 20 rubs with an abrasive felt employing a 2 lb. pressure at a speed of 30–60 rubs per minute. When the printed wire was immersed in a water solution containing 5% NaCl and a potential of 2,000 volt rms. applied for one minute between the primary conducter and an electode, there was no dielectric breakdown in the primary wire insulation and the indicia remained legible. Indicia printed on the polymer coated wire remained legible after a 24 hour exposure in a weatherometer to alternating cycles of UV light and tap water spray.

During more than 800 hours of operation of Ink 2-A in the jet printing units, evaporative losses from the ink supply system were compensated for by the addition, as needed of a makeup composition containing about 1590 ml. methanol, 1893 ml. methyl ethyl ketone, 167 ml. isopropyl alcohol, 125 ml. distilled water and 11 ml. methyl cellosolve.

The above ink compositions were also employed to print indicia, by jet printing, on aluminum and steel beer cans as well as on glass bottles.

EXAMPLE 3

The following ink compositions were prepared from:

| Ink 3A: | |
| --- | --- |
| Ethanol | 400 ml. |
| Ethylene glycol monomethyl ether | 40 ml. |
| Distilled water | 44 ml. |
| Varcum 29-108 epoxy-phenolic resin | 25 g. |
| 26° Baume ammonia water | 2.5 ml. |
| Victoria Blue | 4 gm. |

| Ink 3B: | |
| --- | --- |
| Ethanol | 200 ml. |
| Methyl Ethyl Ketone | 50 ml. |
| Distilled Water | 25 ml. |
| 26° Baume ammonia | 1.5 ml. |
| Varcum 29-108 | 12.7 g. |
| Sodium propionate | 0.25 g. |
| Victoria Blue | 2.0 g. |
| Neozapon Black 2.0 g | |

| Ink 3C: | |
| --- | --- |
| Methanol | 89.5 ml. |
| Methyl Ethyl Ketone | 89.5 ml. |
| Varcum 29-108 | 34.1 g. |
| Distilled Water | 17.9 ml. |
| Isopropanol | 21.3 ml. |
| Victoria Blue | 5.0 g. |
| Sodium Propionate | 0.25 g |

The inks had the following properties:

| | Ink 3A | Ink 3B | Ink 3C |
| --- | --- | --- | --- |
| Brookfield Viscosity: | 1.80 cps. | 1.57 cps. | 1.72 cps. |
| Resistivity: | 2600 ohm-cm. | 1600 ohm-cm. | 1100 ohm-cm. |

The inks 3A to 3C were employed in a jet printing apparatus to print indicia on glass, Kapton polyimide and nylon/polyvinyl chloride surfaces.

The inks showed excellent adhesion, dried in less than 5 seconds and exhibited good printability. Resistance to moisture and ultraviolet radiation was excellent.

The above inks have been found to print on glass having condensed moisture on its surface with good adhesion.

It will be seen from the aforegoing description of the invention that jet ink compositions are provided that are characterized by extremely useful adhesion and resistance properties making them suitable for use in a variety of applications. As is evident from the examples, jet ink compositions of the invention are readily suitable for use in printing polymer coated wire of various types, in printing glass and/or ceramic surfaces and in printing coated and uncoated metal surfaces.

I claim:

1. An ink composition suitable for use in jet printing of polymeric, glass or metal surfaces comprising a solution of (a) an epoxy-phenolic binder resin (b) at least one dye that is soluble and compatible with the components of the composition and (c) a solvent blend consisting essentially of from about 25 to 40% of an alcohol having 1 to 3 carbon atoms and mixtures thereof, from about 5 to 20% of water and from about 25 to 40% of an aliphatic ketone having 3 to 8 carbon atoms and from about 0 to 20% of a lower alkylene glycol ether.

2. An ink composition as claimed in claim 1 wherein said composition also contains an effective amount of an electrolyte.

3. An ink composition as claimed in claim 1 wherein said epoxy-phenolic binder resin is an epoxy ether of bisphenol A.

4. An ink composition as claimed in claims 1 or 3 wherein said colorant is selected from chromium-complexed azo dyes and basic dyes and mixtures thereof.

5. An ink composition as claimed in claim 4 wherein said chromium-complexed azo dyes are Neozapon Black or Hecto Black and said basic dyes are methyl violet, ethyl violet, crystal violet and Victoria Blue.

6. A jet ink composition suitable for use in jet printing of polymer coated wires comprising a solution of (a) from about 4 to 20% of an epoxy ether of bisphenol A having a viscosity within the range of about 100 to about 500 centipoises; (b) from about 1 to 5% of a colorant dye and (c) a solvent mixture comprising from about 25 to 32% methanol, from about 4 to 8% isopropanol, from about 25 to 32% methyl ethyl ketone, from 5 to 20% distilled water and from 0.05 to 0.15% sodium propionate.

7. A jet ink composition suitable for use in jet printing of glass or ceramic surfaces comprising a solution of (a) from 4 to 20% of an epoxy ether of bisphenol A having a viscosity within the range of about 100 to 500; (b) 1 to 5% of a colorant dye and (c) a solvent mixture comprising from about 25 to 40% ethanol or methanol from 0 to 20% ethylene glycol monomethyl ether, from 5 to 20% distilled water, from 0 to 0.5% ammonium hydroxide and 0 to 32% methyl ethyl ketone.

* * * * *